United States Patent Office 2,731,298
Patented Jan. 17, 1956

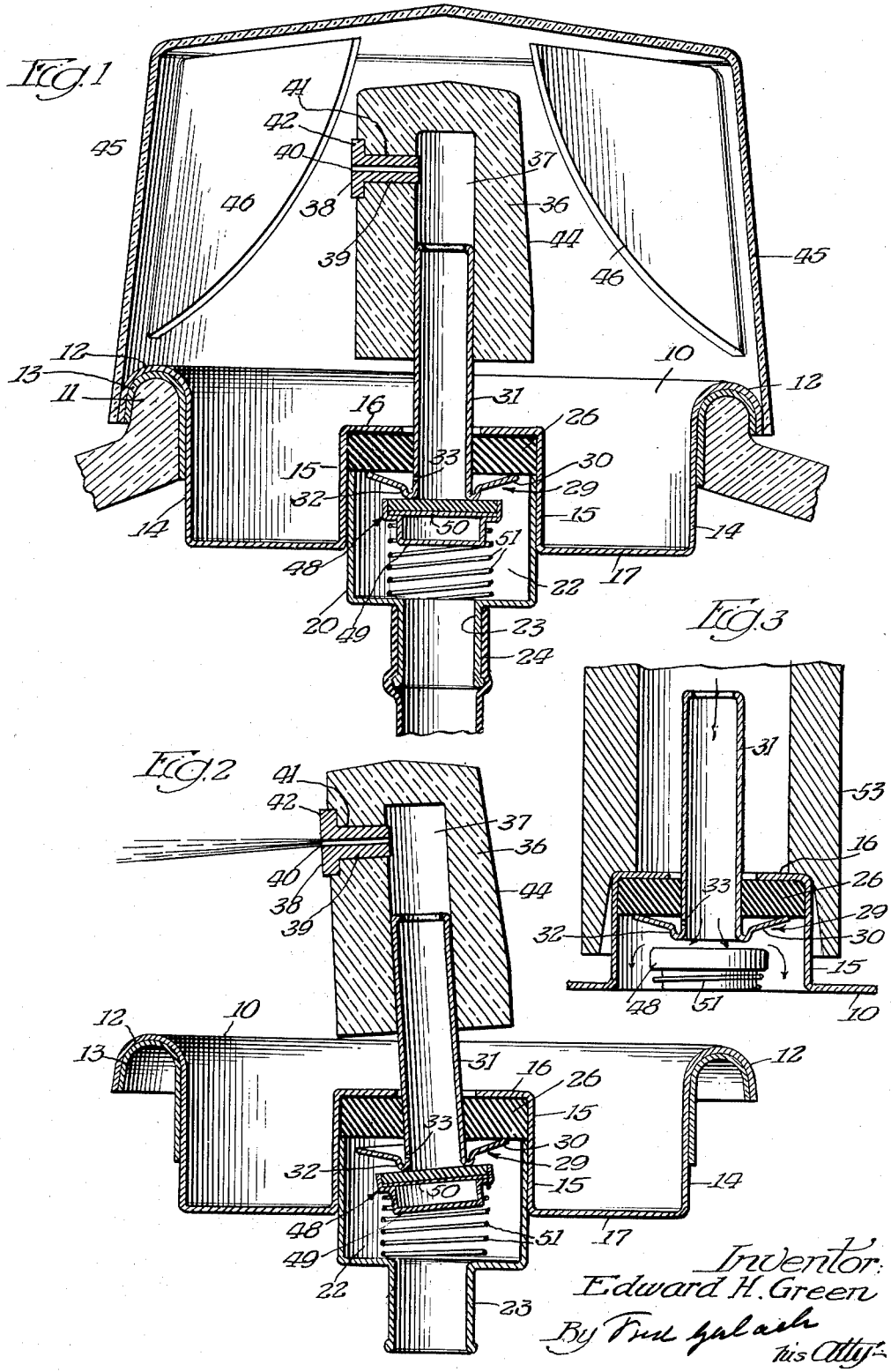

2,731,298

SPRAYING DEVICES

Edward H. Green, Chicago, Ill., assignor to Aerosol Research Company, Chicago, Ill., a corporation of Illinois Application March 16, 1953, Serial No. 342,344

10 Claims. (Cl. 299—95)

The invention relates to spraying devices, and more particularly to the type which is adapted to be used with a receptacle which contains material which is adapted to be expelled from the receptacle by a gas propellant in the form of a spray or mist.

One object of the invention is to provide a spraying device with a manually controlled discharge valve which is adapted for vaporization or atomization and which can be readily filled with the propellant-gas, without passing through the restricted orifices for the outflow of the vaporized material.

Another object of the invention is to provide a spraying device which includes a discharge nozzle and an inlet valve for the gas propellant through which the receptacle can be quickly charged with the gas.

Other objects will appear from the detailed description.

The invention consists in the several novel features which are hereinafter set forth and more particularly defined by claims at the conclusion hereof.

In the drawings:

Fig. 1 is a vertical section of a device embodying the invention, the discharge valve being closed;

Fig. 2 is a section on an enlarged scale, the discharge valve being open; and

Fig. 3 is a section of the device while the receptacle is being charged with gas.

The invention is exemplified in a spraying device which includes a head or cap 10 which is adapted to be sealed to the neck of a receptacle 11 containing the material to be sprayed and the gas propellant. The head 10 is usually formed of sheet metal and includes a marginal bead or flange 12, the inner surface of which is lined with a suitable sealing compound 13 to form a seal between the neck of the receptacle and the head 10. The entire spraying device is supported by the head 10. The head comprises an annular depending wall 14 which fits in the neck of the receptacle, an upstanding central tubular wall 15, a top wall 16 and a bottom wall 17 between walls 14 and 15. A cup shaped member 20 has a press fit with the inner periphery of annular wall 15. The walls 15 and 16 form an inverted cup-shaped member which with the member 20 form a chamber 22 for the discharge and inlet valves. A depending tubular stem 23 on member 20 is connected to a tube 24 which communicates with the receptacle near its bottom for conducting the material to be discharged to the chamber 22.

An elastic disk 26, usually of rubber, is confined between the top wall 16 and upper end of cup-shaped member 20 and its lower face functions as a valve seat.

The elastic disk 26 has a tight fit with the member 15 and the stem 31 to form an air-tight seal between the head 10 and stem 31, to prevent escape of fluid from chamber 22. The stem 31 has clearance in the top wall 16 of head 10 and the elastic disk 26 supports said stem for angular or axial movement for opening valve 29.

Valve 29 functions to selectively control the discharge from the receptacle and comprises an upwardly flared flange or member 30, the rim of which is adapted to seat on the underface of elastic disk 26. The valve 30 has an integral tubular upstanding stem 31 and an annular downwardly facing bead 32 between stem 31 and flange 32 which forms a seat for the inlet valve hereinafter described. The stem 31 is sealed in and resiliently supported in its vertical position by the elastic disk 26, which permits the stem 31 to be depressed axially or deflected angularly for opening the valve 29. A restricted orifice 33 in stem 31 meters the flow of material into the stem 31, when valve 29 is open. When the elastic disk 26 is warped by movement of stem 31, material will flow around a portion of flange 30 which has been separated from disk 26, through orifice 33 into the stem.

An inlet valve 48 functions to admit gas-propellant into chamber 22 and the receptacle 11 through the tubular stem 31 independently of the outlet valve 29 and of the flow through the restricted orifice 33. Valve 48 comprises a cup-shaped member 49 and a disk 50 adapted to seat on the annular bead 32 at the lower end of stem 31. A coil-spring 51 between an annular shoulder on member 49 and the bottom wall of valve-chamber 22, urges the disk 50 against the annular bead 32 and permits movement of the valve 48 with the valve 29 when the latter is opened by stem 31. The inlet valve 48 is movable independently of valve 29 by gas under pressure from an external source in stem 31, for expeditiously charging the receptacle with the propellant, as shown in Fig. 3. The passage in the stem is substantially unrestricted for the free flow of gas through the stem from an external source into chamber 22 when valve 48 is open. During the charging of the receptacle with gas, it is not restricted by the orifice which meters the flow to the chamber in stem 31.

A finger piece or button 36, preferably formed of molded plastic material, is provided for shifting the stem 31 to open valve 29. A socket 37 is formed in button 36 and the stem 31 has a tight friction fit in the lower portion of said socket. The area in stem 31 and in socket 37 form an expansion chamber for the fluid from orifice 33 in stem 31. A nozzle 38 of molded plastic material has a shank 39 provided with a radial discharge orifice 40 and a flange 42 on the outside of button 36. The shank 39 has a drive fit in a radial bore 41 in the button. The side of button 36 opposite the side where the outer end of nozzle terminates is flattened as at 44 for engagement by the thumb of the user for conveniently deflecting the stem 31 angularly to directionally vary the stream of vapor from nozzle 38. The button may also be conveniently depressed by finger pressure against its upper end. The button 36 may be conveniently manipulated by the thumb of a hand in which the receptacle is grasped. This permits the user to manipulate the receptacle as desired for discharging a spray and also to directionally control the stream from the nozzle 38. A cover 45 of molded plastic with reinforcing ribs 46 is adapted to removably fit over and around the flange 12 of head 10 for protecting the button 36 from impact when the device is not in use.

The use and operation of the spraying device will be as follows: the material to be vaporized, such as paint, insecticide, deodorant, lacquer, flock in solution, or other vaporizable material is loaded into the receptacle before the spraying device is connected to the receptacle. It is advantageous to expedite the charging of the receptacle with the gas propellant for selectively discharging the vaporized material. The head 10 of the spraying device, with the button 36 removed from stem 31, is forced into sealed relation with the neck of the receptacle 11. An outlet nozzle or sleeve 53 of a gas-propellant line is seated on the walls 15 and 16 of head 10 and encloses the upper portion of stem 31. When gas under pressure is fed to the sleeve 53, it will open valve 48, as shown in Fig. 3, against the force of spring 51, and flow without substantial restriction through stem 31, around valve 48, and through chamber 22 and tube 24 into the receptacle 11. When the receptacle has been fully charged with gas, nozzle 53 will be removed from the head 10, and the valve 48 will automatically close to retain the gas in the receptacle 11. The button 36 will then be forced onto the stem to the position shown in Fig. 1, and the device will then be operative for selective spraying. The user, by manipulating the button 36, axially or angularly, will open valve 29 against the force of spring 51 which will hold valve 48 seated on the bead 32 of valve 29 and close the lower end of stem 31. By angular movement of the button 36 and nozzle 38 the user may directionally control the spray. When the valve 29 is held open by the user as shown in Fig. 2 the material from the receptacle will be forced by the gas from chamber 22, between the disk 26 and a portion of the edge of flange 30 which is separated from said disk, to the metering orifice 33 in stem 31. The space in the stem 31 and the socket 37 in button 36 will function as an expansion chamber. This expansion results in discharging from nozzle 38 an extremely fine mist or atomized vapor.

During shipment of the spraying devices, the button 36 can be removed. A characteristic of the spraying device is that gas-propellant may be delivered into the receptacle expeditiously because the inlet valve is operable independently of the outlet valve and by-passes the restrictions necessary for vaporization of the material when the material is being discharged.

The invention exemplifies a spraying device which comprises an inlet valve for free flow of gas when charging the receptacle and a separate outlet valve with metered outflow for vaporizing the material.

The invention is not to be understood as restricted to the details set forth since these may be modified within the scope of the appended claims without departing from the spirit and scope of the invention.

Having thus described the invention what I claim as new and desire to secure by Letters Patent is:

1. A spraying device for material with a gas propellant, comprising: a head provided with means for holding it on the top of a receptacle and with a valve-chamber connected to receive material from the receptacle; an elastic disk secured in said head; an outlet valve seating on the disk; an upstanding stem on the outlet valve, supported by the disk, for opening said outlet valve, and provided with a substantially unrestricted passage, and a restricted orifice controlled by the outlet valve for metering the flow from said chamber into the steam; an inlet valve for controlling the flow of gas through said unrestricted passage directly from the stem into said chamber and by-passing said restricted orifice, said inlet valve being adapted to be opened by pressure of fluid independently of the outlet valve and an element removably secured to the stem and provided with a discharge nozzle.

2. A spraying device for material with a gas propellant, comprising: a head provided with means for holding it on the top of a receptacle and with a valve-chamber connected to receive material from the receptacle; an elastic disk secured in said head; an outlet valve seating on the disk; an upstanding stem on the outlet valve, supported by the disk, for opening said outlet valve, and provided with a substantially unrestricted passage; a restricted orifice controlled by the outlet valve, for metering the flow from said chamber into the stem; an inlet valve for controlling the flow of gas through said unrestricted passage directly from the stem into said chamber and by-passing said restricted orifice, said inlet valve being adapted to be opened independently of the outlet valve; spring-means for closing the inlet valve; and an element removably secured to the stem and provided with a discharge nozzle.

3. A spraying device for material with a gas propellant, comprising: a head provided with means for holding it on the top of a receptacle and with a valve-chamber connected to receive material from the receptacle; an elastic disk secured in said head; an outlet valve seating on the disk; with an upstanding stem on the outlet valve, supported by the disk, for opening said outlet valve, and provided with a substantially unrestricted passage; a restricted orifice controlled by the outlet valve for metering the flow from said chamber into the stem; an inlet valve engaging the outlet valve and for closing the lower end of the opening in said stem, and for controlling the flow of gas through said unrestricted passage directly into said chamber and by-passing said restricted orifice, said inlet valve being adapted to be opened independently of the outlet valve and an element removably secured to the stem and provided with a discharge nozzle.

4. A spraying device for material with a gas propellant, comprising: a head provided with means for securing it on the top of a receptacle and with a valve-chamber connected to receive material from the receptacle; an elastic disk secured in said head at the top of said chamber; an upwardly facing outlet valve seating on said disk; an upstanding stem on the outlet valve movably supported by said disk for opening said outlet valve, and provided with a substantially unrestricted passage extending through its upper and lower ends, and with a restricted orifice for metering the flow from said chamber into said stem when the outlet valve is open, an upwardly facing inlet valve for closing the lower end of the passage in the stem, and movable into its open position independently of the outlet valve, by external gas pressure, for substantially unrestricted flow of gas through the stem into said chamber, and a button provided with a spray-nozzle removably secured on the stem.

5. A spraying device for material with a gas propellant, comprising: a head provided with means for securing it on the top of a receptacle and with a valve-chamber connected to receive material from the receptacle; an elastic disk secured in said head at the top of said chamber; an upwardly facing outlet valve seating on said disk; an upstanding stem on the outlet valve, movably supported by said disk, for opening said outlet valve, and provided with a substantially unrestricted passage extending through its upper and lower ends, and with a restricted orifice for metering the flow from said chamber into said stem when the outlet valve is open, an upwardly facing inlet valve for closing the lower end of the passage in the stem and movable into its open position independently of the outlet valve by external gas pressure, for substantially unrestricted flow of gas through the stem into said chamber, a spring for urging the inlet valve against the outlet valve, and a button provided with a spray-nozzle removably secured on the stem.

6. A spraying device for material with a gas propellant, comprising: a head provided with means for securing it on the top of a receptacle and with a valve-chamber connected to receive material from the receptacle; an elastic disk secured in said head at the top of said chamber; an upwardly facing outlet valve including a flange seating on said disk and a downwardly facing annular seat on said flange; an upstanding stem extending upwardly from the outlet valve movably supported by said disk for opening said outlet valve, and provided with a substantially unrestricted passage extending from said seat and through its upper end, and with a restricted orifice for metering the flow from said chamber into said stem when the outlet valve is open, an upwardly facing inlet valve for closing the lower end of the passage in the stem and movable into its open position independently of the outlet valve by external gas pressure for substantially unrestricted flow of gas through the stem into said chamber, and a button provided with a spray-nozzle removably secured on the stem.

7. A spraying device for material with a gas propellant, comprising: a head provided with means for securing it on the top of a receptacle and with a valve-chamber connected to receive material from the receptacle; an elastic disk secured in said head at the top of said chamber; an upwardly facing outlet valve including a flange seating on said disk and a downwardly facing annular seat, a tubular upstanding stem extending upwardly from the annular seat on the outlet valve, movably supported by said disk, for opening said outlet valve, and provided with a substantially unrestricted passage extending through its upper and lower ends, and with a restricted orifice for metering the flow from said chamber into said stem when the outlet valve is open, an upwardly facing inlet valve adapted to engage said annular seat for closing the lower end of the passage in the stem and adapted to be opened by external gas pressure while the inlet valve remains closed, for substantially unrestricted flow of gas through the stem into said chamber, a spring for urging the inlet valve against the annular seat on the outlet valve, and a button provided with a spray-nozzle removably secured on the stem.

8. A spraying device for material with a gas propellant comprising a head provided with means for securing it on the top of a receptacle and with a valve-chamber connected to receive material from the receptacle, an elastic disk secured in said head at the top of said chamber, a tubular stem having a substantially unrestricted interior extending upwardly from said chamber through said disk for substantially unrestricted flow of gas through the stem into said chamber, said disk supporting said stem for tilting and axial movement, an inlet valve seated against the lower end of said stem, said inlet valve being movable to open position by external gas pressure, an outlet valve between said inlet valve and said disk, said outlet valve being seated on said disk and movable to open position by tilting or axial movement of said stem, a spring in said chamber bearing against said inlet valve for closing each of said valves automatically upon release of force exerted to open either of them, and spray discharge means operatively connected to the upper end of said stem.

9. A spraying device for material with a gas propellant comprising a head provided with means for securing it on the top of a receptacle and with a valve-chamber connected to receive material from the receptacle, an elastic disk secured in said head at the top of said chamber, a tubular stem having a substantially unrestricted interior extending upwardly from said chamber through said disk for substantially unrestricted flow of gas through the stem into said chamber, said disk supporting said stem for tilting and axial movement, an inlet valve seated against the lower end of said stem, said inlet valve being movable to open position by external gas pressure, an outlet valve integral with the lower end of said stem, said outlet valve being seated on said disk and movable to open position by tilting or axial movement of said stem, a spring in said chamber bearing against said inlet valve for closing each of said valves automatically upon release of force exerted to open either of them, and spray discharge means operatively connected to the upper end of said stem.

10. A spraying device for material with a gas propellant comprising a head provided wtih means for securing it on the top of a receptacle and with a valve-chamber connected to receive material from the receptacle, an elastic disk secured in said head at the top of said chamber, a tubular stem having a substantially unrestricted interior extending upwardly from said chamber through said disk for substantially unrestricted flow of gas through the stem into said chamber, said disk supporting said stem for tilting and axial movement, an annular flange extending upwardly and outwardly from the lower end of said stem into sealing contact with said disk to form an outlet valve, a restricted orifice in said stem between said disk and said flange for metering the flow from said chamber into said stem when said outlet valve is open, said outlet valve being movable into open position by tilting or axial movement of said stem, an inlet valve seated against the lower end of said stem, a spring in said chamber bearing against said inlet valve for closing each of said valves automatically upon release of force exerted to open either of them, and spray discharge means operatively connected to the upper end of said stem.

References Cited in the file of this patent

UNITED STATES PATENTS

| | | |
|---|---|---|
| 1,971,450 | Heitmuller et al. | Aug. 28, 1934 |
| 2,631,814 | Abplanalp | Mar. 17, 1953 |